(12) United States Patent
Morozov et al.

(10) Patent No.: US 11,861,063 B2
(45) Date of Patent: Jan. 2, 2024

(54) EYE-TRACKING DEVICE AND DISPLAY APPARATUS INCLUDING THE SAME

(71) Applicant: SAMSUNG ELECTRONICS CO., LTD., Suwon-si (KR)

(72) Inventors: Aleksander V. Morozov, Podolsk (RU); Elena G. Malinovskaya, Podolsk (RU); Sergey E. Dubynin, Podolsk (RU); Vladislav V. Druzhin, Podolsk (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 727 days.

(21) Appl. No.: 16/752,114

(22) Filed: Jan. 24, 2020

(65) Prior Publication Data

US 2020/0249754 A1 Aug. 6, 2020

(30) Foreign Application Priority Data

Feb. 5, 2019 (RU) .......................... RU2019103205
Sep. 11, 2019 (KR) ........................ 10-2019-0113016

(51) Int. Cl.
*G06F 3/01* (2006.01)
*G02B 27/00* (2006.01)
(Continued)

(52) U.S. Cl.
CPC .......... *G06F 3/013* (2013.01); *G02B 6/0023* (2013.01); *G02B 6/0026* (2013.01);
(Continued)

(58) Field of Classification Search
CPC .......................... G06F 3/013; G02B 27/0093
See application file for complete search history.

(56) References Cited

U.S. PATENT DOCUMENTS 4,113,388 A * 9/1978 Gates ................... G01B 11/002
250/237 G
9,804,389 B2 10/2017 Popovich et al.
(Continued)

FOREIGN PATENT DOCUMENTS

KR 10-2016-0022855 A 3/2016
RU 106837 U1 7/2011
(Continued)

OTHER PUBLICATIONS

Communication dated Sep. 16, 2020 issued by the European Patent Office in application No. 20154332.9.
(Continued)

*Primary Examiner* — Towfiq Elahi
*Assistant Examiner* — Andrew B Schnirel
(74) *Attorney, Agent, or Firm* — Sughrue Mion, PLLC

(57) ABSTRACT

Provided are an eye-tracking device that may rapidly and accurately track an observer's eye and may be made compact, and a display apparatus including the eye-tracking device. The eye-tracking device includes: a light source configured to emit an illumination light; a light guide plate configured to transmit the illumination light emitted from the light source to an observer's eye and transmit the illumination light reflected from the observer's eye in a direction opposite to a propagation direction of the illumination light emitted from the light source; a photodetector array configured to detect the illumination light reflected from the observer's eye; and a signal processor configured to determine an angle of rotation of the observer's eye based on a two-dimensional (2D) intensity distribution of the illumination light detected by the photodetector array.

21 Claims, 13 Drawing Sheets

(51) Int. Cl.
    *G09G 5/38*   (2006.01)
    *F21V 8/00*   (2006.01)
    *G02B 27/14*  (2006.01)
    *G02B 27/28*  (2006.01)
    *G06F 3/03*   (2006.01)
    *G09G 3/20*   (2006.01)

(52) U.S. Cl.
    CPC ....... *G02B 27/0093* (2013.01); *G02B 27/144* (2013.01); *G02B 27/283* (2013.01); *G06F 3/0304* (2013.01); *G09G 3/20* (2013.01); *G09G 5/38* (2013.01); *G09G 2340/0464* (2013.01); *G09G 2354/00* (2013.01); *G09G 2360/145* (2013.01)

(56) References Cited

U.S. PATENT DOCUMENTS

| | | | |
|---|---|---|---|
| 2010/0157433 A1* | 6/2010 | Mukawa | G02B 27/0176 353/30 |
| 2010/0328444 A1 | 12/2010 | Blixt et al. | |
| 2011/0109528 A1 | 5/2011 | Mun et al. | |
| 2013/0207887 A1 | 8/2013 | Raffle et al. | |
| 2014/0160543 A1* | 6/2014 | Putilin | G02B 6/0023 359/9 |
| 2016/0018639 A1* | 1/2016 | Spitzer | G02B 5/3083 359/13 |
| 2016/0085300 A1 | 3/2016 | Robbins et al. | |
| 2016/0223819 A1* | 8/2016 | Liu | G06F 3/013 |
| 2017/0023793 A1* | 1/2017 | Shtukater | G06T 1/20 |
| 2017/0035293 A1 | 2/2017 | Nistico et al. | |
| 2017/0277259 A1 | 9/2017 | Mullins et al. | |
| 2018/0113303 A1 | 4/2018 | Popovich et al. | |
| 2018/0303573 A1* | 10/2018 | Trulson | A61B 5/0071 |
| 2018/0332275 A1 | 11/2018 | Gruhlke et al. | |
| 2019/0056600 A1 | 2/2019 | Danziger et al. | |
| 2019/0250707 A1* | 8/2019 | Kondo | G02B 27/0179 |
| 2019/0278094 A1* | 9/2019 | Huang | G02B 27/0093 |

FOREIGN PATENT DOCUMENTS

| | | |
|---|---|---|
| WO | 2018/122859 A | 7/2018 |
| WO | 2018122859 A1 | 7/2018 |

OTHER PUBLICATIONS

Communication dated Nov. 7, 2019, issued by the Russian Patent and Trademark Office in Russian Patent Application No. 2019103205.

* cited by examiner

EYE-TRACKING DEVICE AND DISPLAY APPARATUS INCLUDING THE SAME

CROSS-REFERENCE TO RELATED APPLICATIONS

This application claims priority from Russian Patent Application No. 2019103205, filed on Feb. 5, 2019 in the Russian Patent and Trademark Office, and Korean Patent Application No. 10-2019-0113016, filed on Sep. 11, 2019 in the Korean Intellectual Property Office, the disclosures of which are incorporated herein by reference in their entireties.

BACKGROUND

1. Field

Apparatuses and methods consistent with example embodiments relate to an eye-tracking device and a display apparatus including the same, and more particularly, to an eye-tracking device that may rapidly and accurately track an angle of rotation of an observer's eye and may be made compact and a display apparatus including the eye-tracking device.

2. Description of the Related Art

As electronic devices and display apparatuses for realizing virtual reality (VR) have recently been developed, interest in the electronic devices and the display apparatuses has increased. Technology for realizing augmented reality (AR) and mixed reality (MR) as the next development based on VR has also been studied.

AR is a display technology for enhancing the perception of reality by overlaying a virtual object or information on a real-world environment, unlike VR completely based on a virtual world. VR may be commonly used in applications such as games or virtual reality experiences whereas AR may be applied to various real-world environments. In particular, AR is attracting attention as a next-generation display technology suitable for a ubiquitous environment or an Internet of Things (IoT) environment.

VR, AR, or MR devices include an eye-tracking device for detecting an observer's gaze to match a viewpoint of a displayed image to the observer's gaze.

SUMMARY

According to an aspect of an example embodiment, there is provided an eye-tracking device including: a light source configured to emit an illumination light; a light guide plate configured to transmit the illumination light emitted from the light source to an observer's eye and transmit the illumination light reflected from the observer's eye in a direction opposite to a propagation direction of the illumination light emitted from the light source; a photodetector array configured to detect the illumination light reflected from the observer's eye; and a signal processor configured to determine an angle of rotation of the observer's eye based on a two-dimensional (2D) intensity distribution of the illumination light detected by the photodetector array.

The light guide plate may include a first input/output coupler and a second input/output coupler configured to guide the illumination light to be incident into the light guide plate, to travel inside the light guide plate, and to travel outside the light guide plate.

The eye-tracking device may further include a beam splitter configured to transmit the illumination light emitted from the light source to the first input/output coupler and transmit the illumination light incident from the first input/output coupler to the photodetector array.

The light source may face a first surface of the beam splitter, and the photodetector array may face a second surface of the beam splitter. The first surface of the beam splitter may be disposed to oppose the second surface of the beam splitter.

The beam splitter may include a half mirror configured to reflect a first half of the illumination light and transmit a second half of the illumination light.

The beam splitter may include a polarizing beam splitter configured to reflect the illumination light having a first linear polarization component and configured to transmit the illumination light having a second linear polarization component perpendicular to the first linear polarization component.

The eye-tracking device may further include a quarter-wave plate disposed between the beam splitter and the light guide plate.

The eye-tracking device may further include a varifocal lens disposed between the beam splitter and the light guide plate and configured to change a focal length according to a distance between the second input/output coupler and the observer's eye.

The light guide plate may include a first surface and a second surface facing the first surface, wherein the light source and the photodetector array face the first surface of the light guide plate, and the first input/output coupler and the second input/output coupler are disposed on the second surface of the light guide plate.

The light guide plate may include a first surface and a second surface facing the first surface, wherein the light source and the photodetector array face the first surface of the light guide plate, and the first input/output coupler and the second input/output coupler are disposed on the first surface of the light guide plate.

The second input/output coupler may include a holographic optical element having a positive refractive power to focus the illumination light, which is output from the light guide plate and passes through a pupil of the observer's eye, on a center of the observer's eye.

The light source may include an infrared light source that emits an infrared light as the illumination light.

The photodetector array may include a plurality of infrared detectors that are arranged in a two-dimensional (2D) manner.

The light guide plate may have a curved shape.

According to an aspect of another example embodiment, there is provided a display apparatus including: an image forming device configured to form an image: an eye-tracking device configured to track an observer's gaze and including: an infrared light source configured to emit an infrared illumination light; a photodetector array including a plurality of infrared detectors that are arranged in a two-dimensional (2D) manner; a light guide plate configured to transmit the infrared illumination light emitted from the infrared light source to the observer's eye and transmit the infrared illumination light reflected from the observer's eye to the photodetector array; and a signal processor configured to determine the observer's gaze based on a 2D intensity distribution of infrared light detected by the photodetector array; and an image shifter configured to move the image according to the angle of rotation of the observer's eye.

The image forming device may further include: a visible light source configured to emit a visible light; and a spatial light modulator configured to modulate the visual light emitted from the visible light source and generate the image.

The light guide plate may include: a first input/output coupler and a second input/output coupler configured to guide the infrared illumination light to be incident into the light guide plate, to travel inside the light guide plate, and to travel outside the light guide plate; an input coupler configured to guide the visible light into the light guide plate; and an output coupler configured to output the visible light traveling inside the light guide plate to an outside of the light guide plate.

The light guide plate may include a first surface and a second surface facing the first surface, wherein the input coupler and the output coupler are disposed on the first surface of the light guide plate, and the first input/output coupler is disposed on the second surface of the light guide plate to face the input coupler, and the second input/output coupler is disposed on the second surface of the light guide plate to face the output coupler.

The display apparatus may further include a wavelength selective mirror facing the input coupler and the first input/output coupler and configured to combine the infrared illumination light emitted from the infrared light source with the image formed by the image forming device and cause a combination of the infrared illumination light and the image to propagate through a same optical path.

The display apparatus may further include a beam splitter disposed between the wavelength selective mirror and the light guide plate and configured to transmit the infrared illumination light emitted from the infrared light source to the first input/output coupler and transmit the infrared illumination light received from the first input/output coupler to the photodetector array.

The infrared light source may face a first surface of the beam splitter and the photodetector array may face a second surface of the beam splitter.

The beam splitter may be configured to reflect a first half of the infrared illumination light, transmit a second half of the infrared illumination light, and transmit the visible light.

The beam splitter may be configured to reflect the infrared illumination light having a first linear polarization component, transmit the infrared illumination light having a second linear polarization component perpendicular to the first linear polarization component, and transmit the visible light.

The display apparatus may further include a quarter-wave plate disposed between the beam splitter and the light guide plate.

The display apparatus may further include a varifocal lens disposed between the beam splitter and the light guide plate and configured to change a focal length according to a distance between the second input/output coupler and the observer's eye.

The display apparatus may be a head mounted display, a glasses-type display, or a goggle-type display.

The display apparatus may include a virtual reality (VR) display apparatus, an augmented reality (AR) display apparatus, or a mixed reality (MR) display apparatus.

BRIEF DESCRIPTION OF THE DRAWINGS

The above and/or other aspects will be more apparent by describing certain example embodiments, with reference the accompanying drawings, in which.

DETAILED DESCRIPTION

Figure 1:
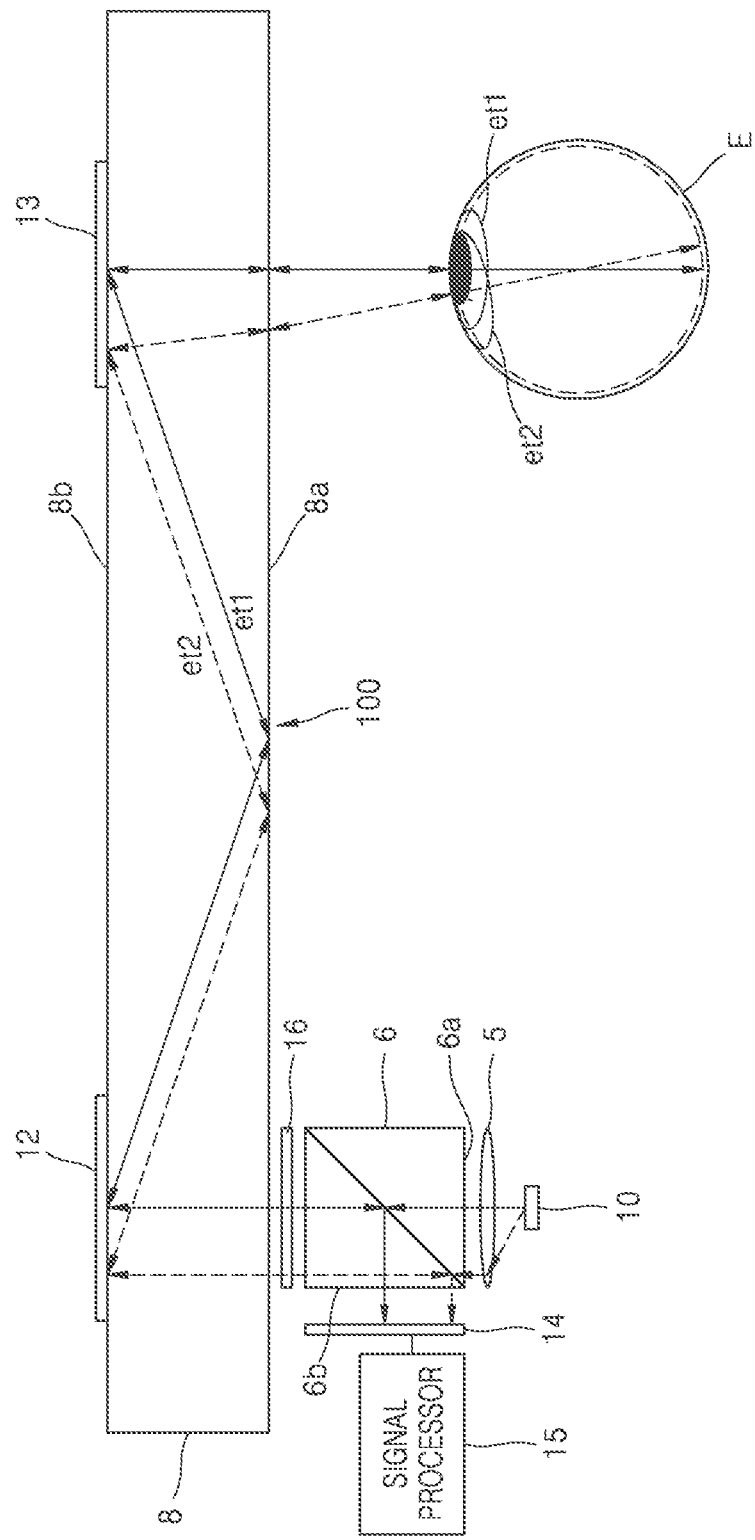
FIG. 1 is a cross-sectional view illustrating a structure of an eye-tracking device according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

An eye-tracking device and a display apparatus including the same will now be described more fully with reference to the accompanying drawings, in which example embodiments are shown. The same reference numerals in the drawings denote the same elements, and sizes of elements in the drawings may be exaggerated for clarity and convenience of explanation. Also, example embodiments are described, and various modifications may be made from the example embodiments. Also, when a first element is "on" or "over" a second element in a layer structure, it may include a case where a first element contacts a second element and is directly disposed on the top, bottom, left, or right of the second element, and a case where the first element does not contact the second element and is disposed on the top, bottom, left, or right of the second element with a third element therebetween.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a cross-sectional view illustrating a structure of an eye-tracking device according to an example embodiment. Referring to FIG. 1, an eye-tracking device 100 according to an example embodiment may include a light source 10 that emits illumination light, a photodetector array 14 that detects light, a light guide plate 8 that transmits the illumination light emitted from the light source 10 to an observer's eye E and transmits illumination light reflected from the retina of the observer's eye E in a direction opposite to a propagation direction of the illumination light emitted from the light source 10, and a signal processor 15 that determines an angle of rotation of the observer's eye based on an output of the photodetector array 14.

The light source 10 may be an infrared light source that emits infrared light. For example, the light source 10 may be a laser diode (LD) or a light-emitting diode (LED) that emits near-infrared light having a wavelength ranging from about 750 nm to about 3 μm. Also, a low-power light source satisfying the safety standards for human eyes may be selected as the light source 10.

The photodetector array 14 may include a plurality of infrared detectors for detecting infrared light. For example, the photodetector array 14 may include an array of infrared detectors that are arranged in a two-dimensional (2D) manner and may detect light in a near-infrared band. In particular, the plurality of infrared detectors of the photodetector array 14 may be photodiodes having a high sensitivity to a wavelength band of the illumination light emitted from the light source 10.

The light guide plate 8 may be formed of a material transparent to infrared light to function as an optical waveguide for transmitting the illumination light. For example, the light guide plate 8 may be formed of a material such as polymethyl methacrylate (PMMA) or polydimethylsiloxane (PDMS). Also, the light guide plate 8 may have a thin flat panel construction. The light guide plate 8 may include a first surface 8a and a second surface 8b opposite to the first surface 8a. From a perspective of the observer, the first surface 8a and the second surface 8b may be referred to as a front surface and a rear surface, respectively. The light source 10 and the photodetector array 14 may be disposed closer to the first surface 8a of the light guide plate 8 than to the second surface 8b of the light guide plate 8, and first and second input/output couplers 12 and 13 configured to obliquely guide incident light into the light guide plate 8 and output light obliquely traveling inside the light guide plate 8 to the outside of the light guide plate 8 may be disposed on the second surface 8b of the light guide plate 8. For example, the first input/output coupler 12 may be disposed on an edge portion of the second surface 8b of the light guide plate 8, and the second input/output coupler 13 may be disposed on another edge portion of the second surface 8b of the light guide plate 8.

The first and second input/output couplers 12 and 13 are configured to obliquely guide light, which is incident in a direction substantially perpendicular to the first and second input/output couplers 12 and 13 from the outside of the light guide plate 8, into the light guide plate 8. For example, the first and second input/output couplers 12 and 13 may be configured to guide light, which is incident on the first and second input/output couplers 12 and 13 within a predetermined angle of incidence in a direction perpendicular to surfaces of the first and second input/output couplers 12 and 13, into the light guide plate 8. The light guided into the light guide plate 8 is repeatedly totally reflected by the first surface 8a and the second surface 8b and travels inside the light guide plate 8.

Also, the first and second input/output couplers 12 and 13 are configured to output light, which is obliquely incident on the first and second input/output couplers 12 and 13 from the inside of the light guide plate 8, in the substantially perpendicular direction to the outside of the light guide plate 8. The first and second input/output couplers 12 and 13 may be configured to be applied only to light obliquely incident on the surfaces of the first and second input/output couplers 12 and 13 within the predetermined angle of incidence range and not to be applied to light perpendicularly incident on the surfaces of the first and second input/output couplers 12 and 13. In other words, the first and second input/output couplers 12 and 13 may simply function as transparent flat panels for light perpendicularly incident on the surfaces of the first and second input/output couplers 12 and 13.

Each of the first and second input/output couplers 12 and 13 may include, for example, a diffractive optical element (DOE) or a holographic optical element (HOE). The DOE includes a plurality of periodic fine grating patterns. The plurality of periodic grating patterns of the DOE function as diffraction gratings and diffract incident light. In particular, the grating patterns may change a propagation direction of light by causing destructive interference and constructive interference by diffracting light incident in a specific angle range, according to a size, a height, a period, etc. of the grating patterns. Also, the HOE includes periodic fine patterns of materials having different refractive indices, instead of grating patterns. Although the configuration of the HOE is different from that of the DOE, the operating principle of the HOE may be substantially the same as that of the DOE.

The DOE or the HOE included in each of the first and second input/output couplers 12 and 13 may be configured to be dependent on a wavelength. In other words, the first and second input/output couplers 12 and 13 may be configured to function as input/output couplers only for a wavelength band of the illumination light emitted from the light source 10 and to be transparent to light in other wavelength bands. For example, only light in an infrared band may be coupled by the first and second input/output couplers 12 and 13, and light in other wavelength bands such as visible light may be transmitted through the first and second input/output couplers 12 and 13.

In this configuration of the light guide plate 8, light incident on the first input/output coupler 12 travels inside the light guide plate 8 through total reflection and then is output to the outside of the light guide plate 8 through the second input/output coupler 13, and light incident on the second input/output coupler 13 travels inside the light guide plate 8 through total reflection and then is output to the outside of the light guide plate 8 through the first input/output coupler 12. The light source 10 may be aligned with the first input/output coupler 12 so that the light source 10 and the first input/output coupler 12 are located at a same position in a longitudinal direction (a horizontal direction) of the light guide plate 8. The second input/output coupler 13 may be disposed at a predetermined position in the longitudinal direction of the light guide plate 8, where the observer's eye E is assumed to be placed. As shown in FIG. 1, when the light source 10 faces the first input/output coupler 12 and the observer's eye E faces the second input/output coupler 13, the illumination light emitted from the light source 10 first passes through the first surface 8a and is incident on the first input/output coupler 12. Next, the illumination light travels inside the light guide plate 8 in a first direction (i.e., rightward in FIG. 1). The illumination light is diffracted by the second input/output coupler 13, passes through the first surface 8a of the light guide plate 8, and reaches the observer's eye E. The illumination light reflected by the observer's eye E passes through the first surface 8a of the light guide plate 8, is incident on the second input/output coupler 13, and then travels inside the light guide plate 8 in a second direction (i.e., leftward in FIG. 1) that is opposite to the first direction. The illumination light reflected by the observer's eye E is diffracted by the first input/output coupler 12, passes through the first surface 8a of the light guide plate 8, and reaches the photodetector array 14.

In order to separate the illumination light emitted from the light source 10 from the illumination light reflected by the observer's eye E, the eye-tracking device 100 may further include a beam splitter 6. The beam splitter 6 may be disposed closer to the first surface 8a of the light guide plate 8 than to the second surface 8b of the light guide plate 8, and may face the first input/output coupler 12. The beam splitter 6 may include a first surface 6a and a second surface 6b that are adjacent to each other and shares a vertex of the beam splitter 6. The light source 10 may face the first surface 6a and the photodetector array 14 may face the second surface 6b. Also, the eye-tracking device 100 may further include a collimating lens 5 disposed between the light source 10 and the beam splitter 6 and configured to make a beam emitted from the light source 10 parallel. The light source 10, the collimating lens 5, the beam splitter 6, and the first input/output coupler 12 may be aligned with one another, whereas the photodetector array 14 may be disposed in an optical path bent about 90° by the beam splitter 6.

In this configuration, the beam splitter 6 may be configured to transmit the illumination light emitted from the light source 10 and reflect the illumination light reflected by the observer's eye E. The illumination light emitted from the light source 10 may be incident on the first surface 6a of the beam splitter 6, may pass through the beam splitter 6, and may reach the first input/output coupler 12. The illumination light reflected by the observer's eye E may be output-coupled by the first input/output coupler 12, may be reflected by the beam splitter 6, and may be incident on the photodetector array 14 through the second surface 6b of the beam splitter 6.

The beam splitter 6 may be, for example, a half mirror that simply reflects half of incident light and transmits the other half. Instead, the beam splitter 6 may be a polarizing beam splitter having polarization selectivity. For example, the beam splitter 6 may be configured to reflect light having a first linear polarization component and transmit light having a second linear polarization component perpendicular to the first linear polarization component. In particular, light having the second linear polarization component from among the illumination light emitted from the light source 10 passes through the beam splitter 6 and is incident on the first input/output coupler 12. In order to improve light use efficiency, the light source 10 may be a polarized light source such as a polarized laser that emits only light having the second linear polarization component. Accordingly, the illumination light emitted from the light source 10 may pass through the beam splitter 6 and may be incident on the first input/output coupler 12 with little loss.

When the beam splitter 6 is a polarizing beam splitter, the eye-tracking device 100 may further include a quarter-wave plate 16 disposed between the first surface 8a of the light guide plate 8 and the beam splitter 6. The light source 10, the collimating lens 5, the beam splitter 6, the quarter-wave plate 16, and the first input/output coupler 12 may be aligned with one another. The quarter-wave plate 16 delays incident light by a quarter wavelength of the incident light. Accordingly, the illumination light having the second linear polarization component passing through the beam splitter 6 has a second circular polarization component while passing through the quarter-wave plate 16. Next, the illumination light is reflected by the observer's eye E in a direction opposite to an incident direction and has a first circular polarization component opposite in a rotational direction to the second circular polarization component. The illumination light having the first circular polarization component passes through the quarter-wave plate 16 again to have the first linear polarization component and is reflected by the beam splitter 6. The illumination light reflected by the beam splitter 6 is incident on the photodetector array 14.

Also, the beam splitter 6 may be configured to have a wavelength selectivity. In other words, the beam splitter 6 may be configured to function as a beam splitter only for a wavelength band of the illumination light emitted from the light source and to be transparent to light in other wavelength bands. For example, the beam splitter 6 may serve as a half mirror or a polarizing beam splitter only for light in an infrared band and may transmit light in other wavelength bands such as visible light.

In a structure of the eye-tracking device 100 according to the present example embodiment, a 2D intensity distribution of the illumination light emitted from the light source 10, incident on the observer's eye E, and reflected from the observer's eye E to the photodetector array 14 may vary according to an angle of rotation of the observer's eye E. For example, as shown by et1 of FIG. 1, when the observer's eye E looks directly at the second input/output coupler 13, that is, when an optical axis of the pupil of the observer's eye E is perpendicular to the second input/output coupler 13, the illumination light output-coupled in a direction perpendicular to the second input/output coupler 13 from among the illumination light emitted from the light source 10 mainly reaches the retina of the observer's eye E. Next, the illumination light reflected by the retina is perpendicularly incident on the second input/output coupler 13, travels in the opposite direction along the same optical path as a previous optical path, and is mainly incident on a central portion of the photodetector array 14, as marked by a solid line. Only a small part of the illumination light output-coupled in a direction oblique to the second input/output coupler 13 from among the illumination light emitted from the light source 10 may be reflected by the retina of the observer's eye E and may reach the photodetector array 14.

As shown by et2 of FIG. 1, when the observer's eye E obliquely looks at the second input/output coupler 13, that is, when the optical axis of the pupil of the observer's eye E is inclined with respect to the second input/output coupler 13, the illumination light output-coupled in a direction oblique to the second input/output coupler 13 from among the illumination light emitted from the light source 10 mainly reaches the retina of the observer's eye E. In particular, the illumination light output-coupled by the second input/output coupler 13 at the same angle as an angle formed between the optical axis of the pupil of the observer's eye E and the second input/output coupler 13 mainly reaches the retina of the observer's eye E. Next, the illumination light reflected by the retina are obliquely incident on the second input/output coupler 13, travels in the opposite direction along the same optical path as a previous optical path, and is mainly incident on a peripheral portion of the photodetector array 14, as marked by a dashed line. Only a small part of the illumination light output-coupled by the second input/output coupler 13 at an angle different from an angle formed between the optical axis of the pupil of the observer's eye E and the second input/output coupler 13 from among the illumination light emitted from the light source 10 may be reflected by the retina of the observer's eye E and may reach the photodetector array 14.

Accordingly, the illumination light incident on the observer's eye E along the optical axis of the pupil of the observer's eye E may be reflected by the retina of the observer's eye E and may return to the photodetector array 14. In order to cause the illumination light reflected by the retina of the observer's eye E to travel in the opposite direction along the same optical path as the previous optical path, the second input/output coupler 13 may be configured to have no optical refractive power or to intentionally have an optical refractive power. For example, FIG. 2A illustrates a path of a beam in the observer's eye E when the second input/output coupler 13 of the eye-tracking device 100 has no optical refractive power, and FIG. 2B illustrates a path of a beam in the observer's eye E when the second input/output coupler 13 of the eye-tracking device 100 has an optical refractive power.

Figure 2A:
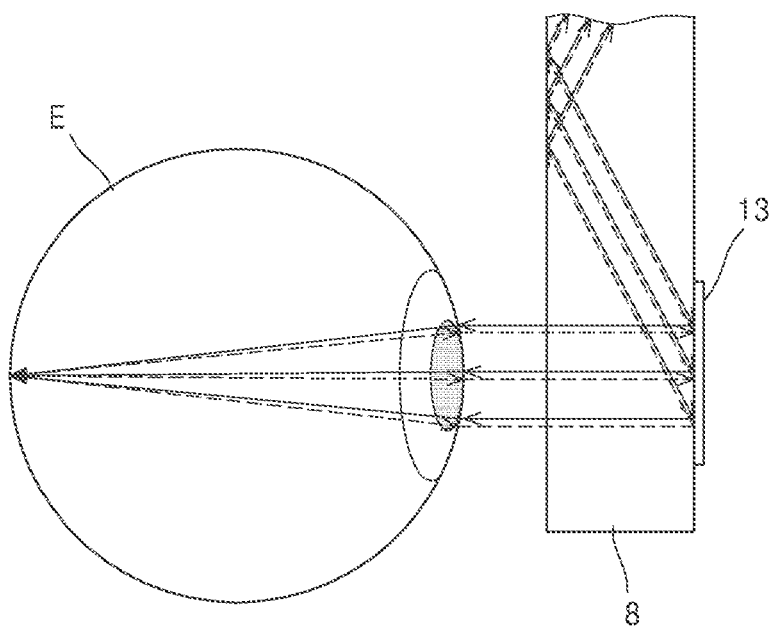
FIG. 2A illustrates a path of a beam in an observer's eye when an input/output coupler of the eye-tracking device has no optical refractive power.

Referring to FIG. 2A, the second input/output coupler 13 may be configured to output-couple light, which is incident on the second input/output coupler 13 at the same angle from the inside of the light guide plate 8, at the same angle. Accordingly, the light incident on the second input/output coupler 13 at the same angle from the inside of the light guide plate 8 is output-coupled by the second input/output coupler 13 to form parallel beams. Light incident on the pupil of the observer's eye E in a direction parallel to the optical axis of the pupil of the observer's eye E from among the output-coupled parallel beams is focused on the retina of the observer's eye E by the pupil. Next, light reflected by the retina of the observer's eye E becomes a parallel beam again by the pupil of the observer's eye E and is incident on the second input/output coupler 13. Accordingly, illumination light may travel in the opposite direction along the same optical path as a previous optical path and may reach the photodetector array 14.

Figure 2B:
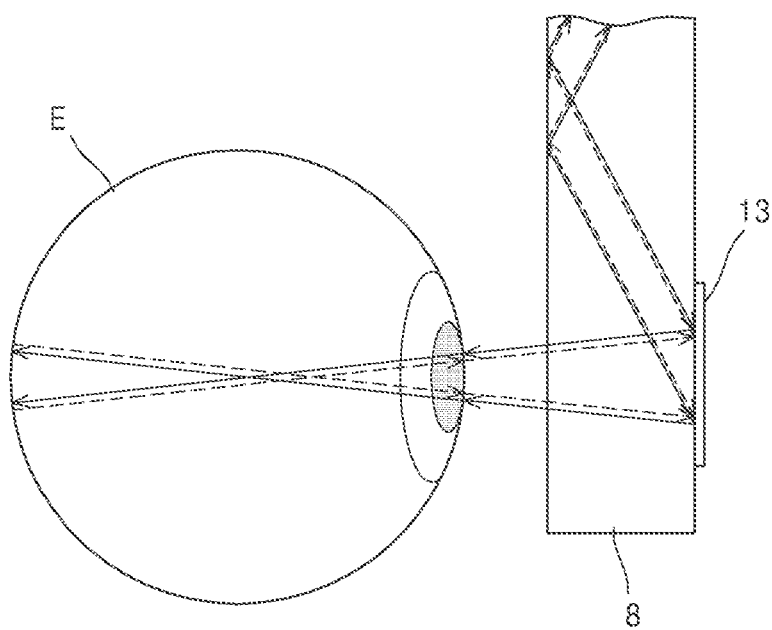
FIG. 2B illustrates a path of a beam in the observer's eye when the input/output coupler of the eye-tracking device has an optical refractive power.

Also, referring to FIG. 2B, the second input/output coupler 13 may be configured to output-couple light incident on the second input/output coupler 13 at the same angle from the inside of the light guide plate 8 and focus the output-coupled light on one point. In other words, the second input/output coupler 13 may be configured to perform not only a function of an input/output coupler but also a function of a lens having a positive (+) refractive power. To this end, the second input/output coupler 13 may include the HOE designed to have a positive (+) refractive power. In more detail, the second input/output coupler 13 may have a positive (+) refractive power to additionally focus light, which is incident on the pupil of the observer's eye E, in front of the retina, particularly, on the center of rotation of the eye E, due to the pupil of the observer's eye E.

Accordingly, light incident on the pupil of the observer's eye E along the optical axis of the pupil of the observer's eye E from among illumination light output-coupled by the second input/output coupler 13 may be focused on the center of rotation of the observer's eye E and then may be perpendicularly incident on the retina of the observer's eye E. In this case, because the illumination light is perpendicularly incident on the retina of the observer's eye E, reflected illumination light travels in the opposite direction along the same optical path as a previous optical path from the retina of the observer's eye E. Also, light passing through the pupil in a direction perpendicular to the pupil of the observers eye E, that is, along with the optical axis of the pupil of the observer's eye E, always exists at the center of rotation of the observer's eye E, regardless of a position of the eye E. Accordingly, a range of a region where the position of the observer's eye E may be tracked is increased. Also, because illumination light having a large beam diameter may not be required to ensure that the illumination light is incident on the pupil of the observer's eye E, light use efficiency may be improved and power consumption of the eye-tracking device 100 may be reduced.

As described above, only a part of the illumination light emitted from the light source 10 is reflected by the retina of the observer's eye E and reaches the photodetector array 14. The illumination light reaching the photodetector array 14 varies according to an angle formed between the optical axes of the pupil of the observer's eye E and the second input/output coupler 13. In particular, a 2D intensity distribution of the illumination light incident on the photodetector array 14 may vary according to an angle formed between the optical axis of the pupil of the observer's eye E and the second input/output coupler 13. Such a 2D intensity distribution of incident light may be detected by a plurality of infrared detectors of the photodetector array 14.

Figure 3:
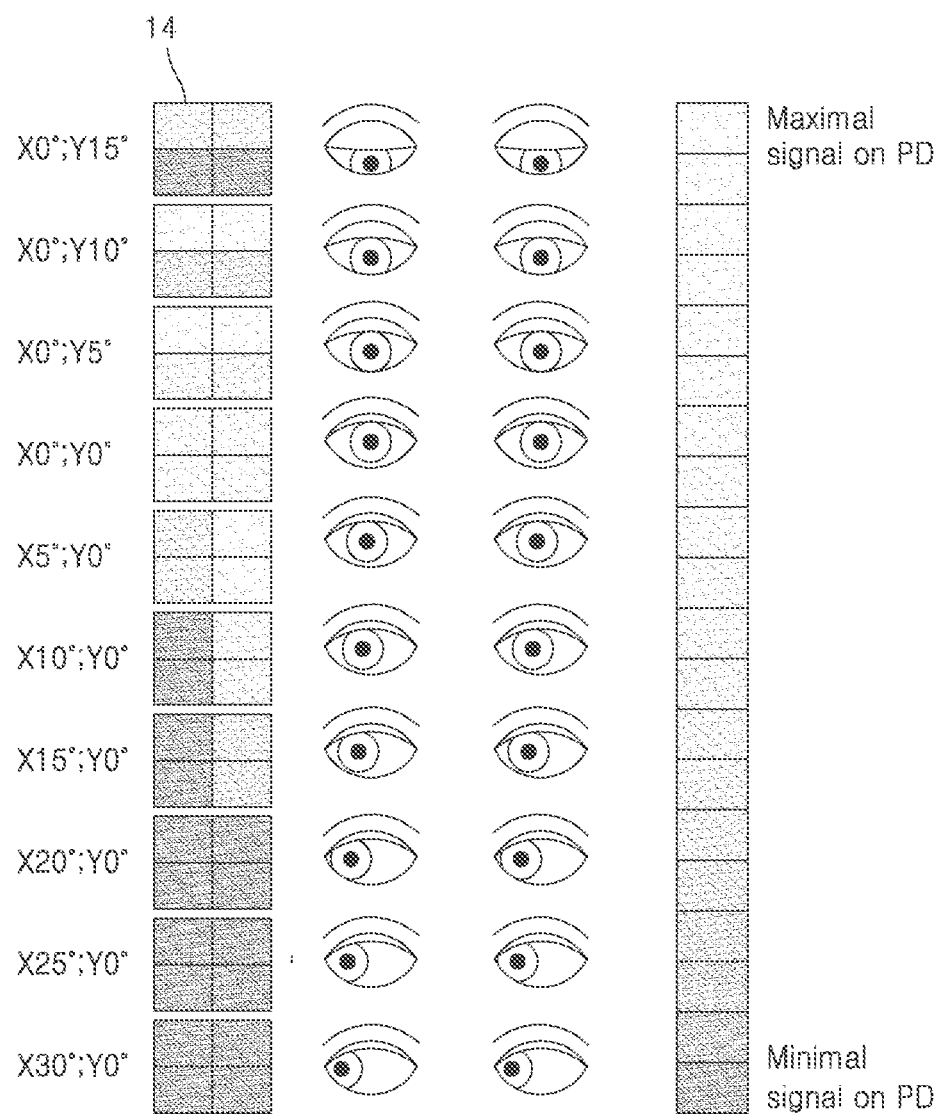
FIG. 3 illustrates a change in an output of a photodetector array according to the rotation of the observer's eye when the photodetector array includes a 2×2 array of infrared detectors.

For example, FIG. 3 illustrates a change in an output of the photodetector array 14 according to the rotation of the observer's eye E when the photodetector array 14 includes a 2×2 array of photodiodes. In FIG. 3, X denotes a rotational displacement in a left-and-right direction of the observer's eye E, and Y denotes a rotational displacement in an up-and-down direction of the observer's eye E. Referring to FIG. 3, when the observer's eye E looks straight ahead, that is, in the case of X0° Y0°, light having substantially the same intensity is incident on four photodiodes. In particular, the intensity of the incident light is slightly greater than a middle intensity between a minimum intensity and a maximum intensity of light incident on each photodiode in an entire angle range of the rotation of the observer's eye E.

As an optical axis of the pupil of the observer's eye E is inclined with respect to a light incident surface of the second input/output coupler 13, an intensity of light incident on some photodiodes increases and an intensity of light incident on other photodiodes decreases. For example, when the observer's eye E laterally rotates (e.g., X5° Y0°, X10° Y0°, and X15° Y0°), an intensity of light incident on photodiodes arranged on the left side increases/decreases or an intensity of light incident on photodiodes arranged on the right side decreases/increases. However, when an angle of rotation of the observer's eye E in the left-and-right direction exceeds a detection limit of the eye-tracking device 100 (e.g., X20° Y0°, X25° Y0°, and X30° Y0°), an intensity of light incident on all photodiodes is minimized. Likewise, as the observer's eye E vertically rotates (e.g., X0° Y5°, X0° Y10°, and X0° Y15°), an intensity of light incident on photodiodes arranged on the upper side increases/decreases or an intensity of light incident on photodiodes arranged on the lower side decreases/increases. When an angle of rotation of the observer's eye E in the up-and-down direction exceeds a detection limit of the eye-tracking device 100, an intensity of light incident on all photodiodes is minimized. The detection limit of the eye-tracking device 100 in each of the left-and-right direction and the up-and-down direction in FIG. 3 is about ±15°.

Figure 4:
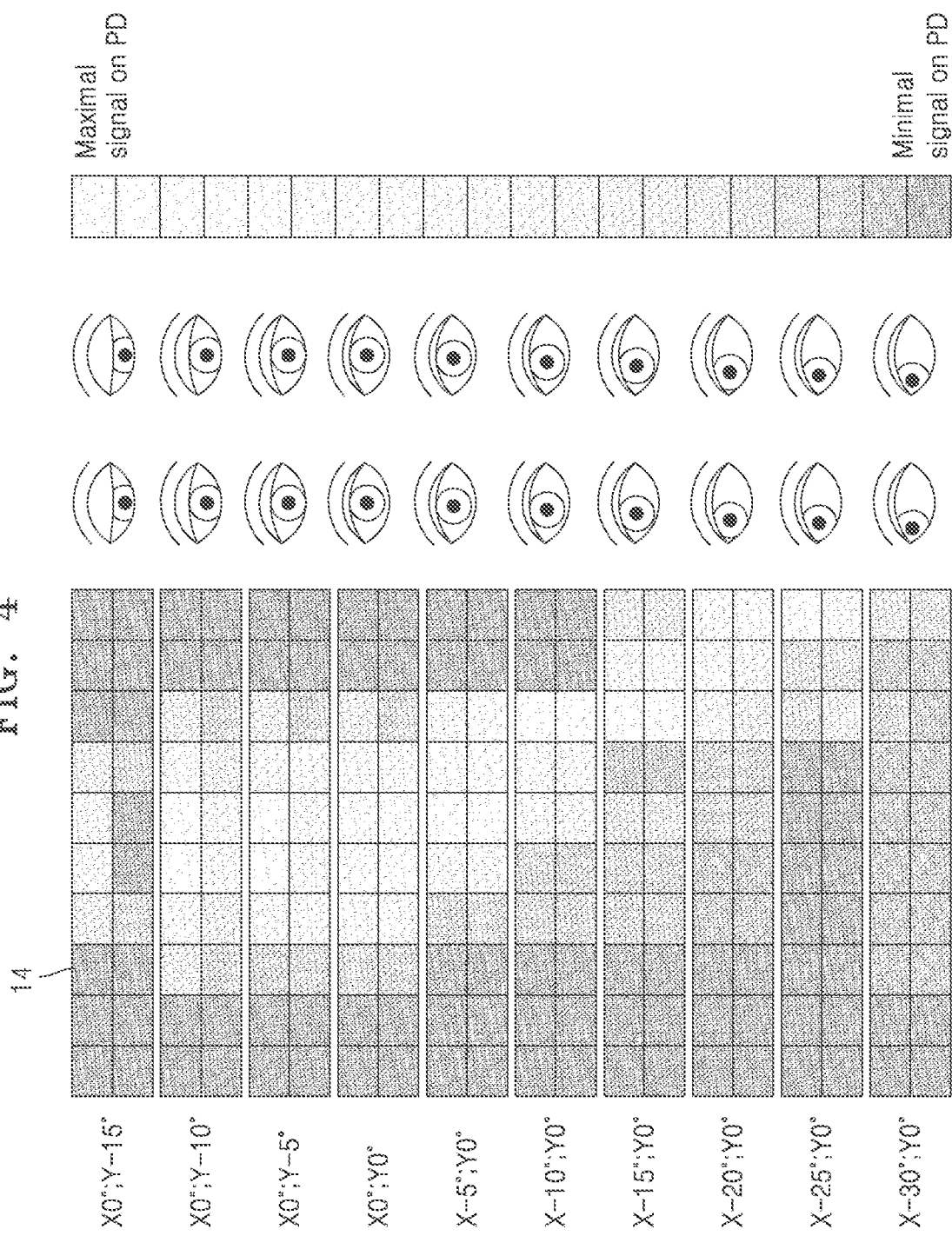
FIG. 4 illustrates a change in an output of the photodetector array according to the rotation of the observer's eye when the photodetector array includes a 2×10 array of infrared detectors.

Also, FIG. 4 illustrates a change in an output of the photodetector array 14 according to the rotation of the observer's eye E when the photodetector array 14 includes a 2×10 array of photodiodes. Referring to FIG. 4, when the observer's eye E looks straight ahead, light having substantially the same intensity is incident on four photodiodes at the center, and an intensity of light incident on photodiodes gradually decreases away from the center. As the observer's eye E laterally rotates (e.g., X5° Y0°, X10° Y0°, X15° Y0°, X20° Y0°, X25° Y0°, and X30° Y0°), an intensity of light incident on photodiodes on the left side increases/decreases or an intensity of light incident on photodiodes on the right side decreases/increases, and a region where light is mainly incident in the photodetector array 14 moves leftward or rightward. In FIG. 4, a detection limit of the eye-tracking device 100 in the left-and-right direction is about ±35° and a detection limit of the eye-tracking device 100 in the up-and-down direction is about ±15°.

The detection limit of the eye-tracking device 100 described with reference to FIGS. 3 and 4 is an example merely provided for better understanding, and the detection limit of the eye-tracking device 100 may be determined according to the number of photodiodes two-dimensionally arranged in the photodetector array 14 or optical properties of the light guide plate 8 and the first and second input/output couplers 12 and 13.

As described above, an angle of rotation of the observer's eye E may be accurately tracked based on a change in an output of the photodetector array 14 of FIGS. 3 and 4. For example, the signal processor 15 may determine an angle of rotation of the observer based on a 2D intensity distribution of light detected by the photodetector array 14. To this end, the signal processor 15 may include previously measured information about a relationship between a 2D intensity distribution of light detected by the photodetector array 14 and an angle of rotation of the observer's eye E.

The signal processor 15 may include or communicate with a computer-readable recording medium storing computer-readable code. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs.

In this way, the eye-tracking device 100 according to the present example embodiment may accurately detect an angle of rotation of the observer's eye E over a wide angle range. Also, the eye-tracking device 100 may relatively rapidly track the observer's eye because the eye-tracking device 100 does not require a complicated calculation, unlike an existing eye-tracking device that analyzes an eye image obtained by using a charge-coupled device (CCD) image sensor or a complementary metal-oxide-semiconductor (CMOS) image sensor by using software through an image processing algorithm. Also, because the eye-tracking device 100 uses only photodiodes, the eye-tracking device 100 may be manufactured relatively inexpensively. Also, because the eye-tracking device 100 uses the light guide plate 8 that is relatively thin, the eye-tracking device 100 may be made compact to have a small thickness and a small weight. Also, because the eye-tracking device 100 does not need to use a high power light source, power consumption is relatively small and the risk of damage to the observer's eye is relatively small.

Figure 5:
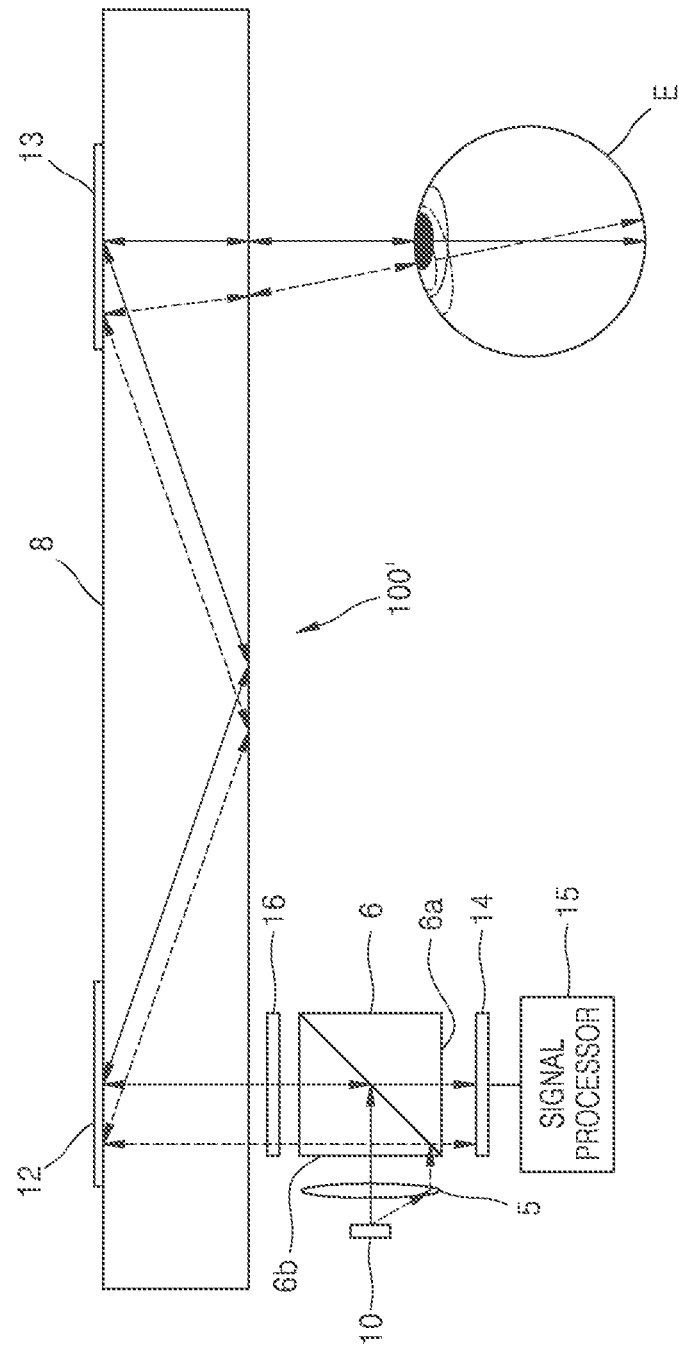
FIG. 5 is a cross-sectional view illustrating a structure of an eye-tracking device according to another example embodiment.

FIG. 5 is a cross-sectional view illustrating a structure of an eye-tracking device 100' according to another example embodiment. Compared to the eye-tracking device 100 of FIG. 1, in the eye-tracking device 100' of FIG. 5, positions of the light source 10 and the photodetector array 14 are changed. For example, the photodetector array 14 may face the first surface 6a of the beam splitter 6, and the light source 10 may face the second surface 6b of the beam splitter 6. When the beam splitter 6 is configured to reflect light having a first linear polarization component and to transmit light having a second linear polarization component perpendicular to the first linear polarization component, the light source 10 may include a polarized laser that emits only light having the first linear polarization component. Instead, the light source 10 may include a polarized laser that emits only light having the second linear polarization component, and the beam splitter 6 may be configured to reflect light having the second linear polarization component and to transmit light having the first linear polarization component.

Figure 6:
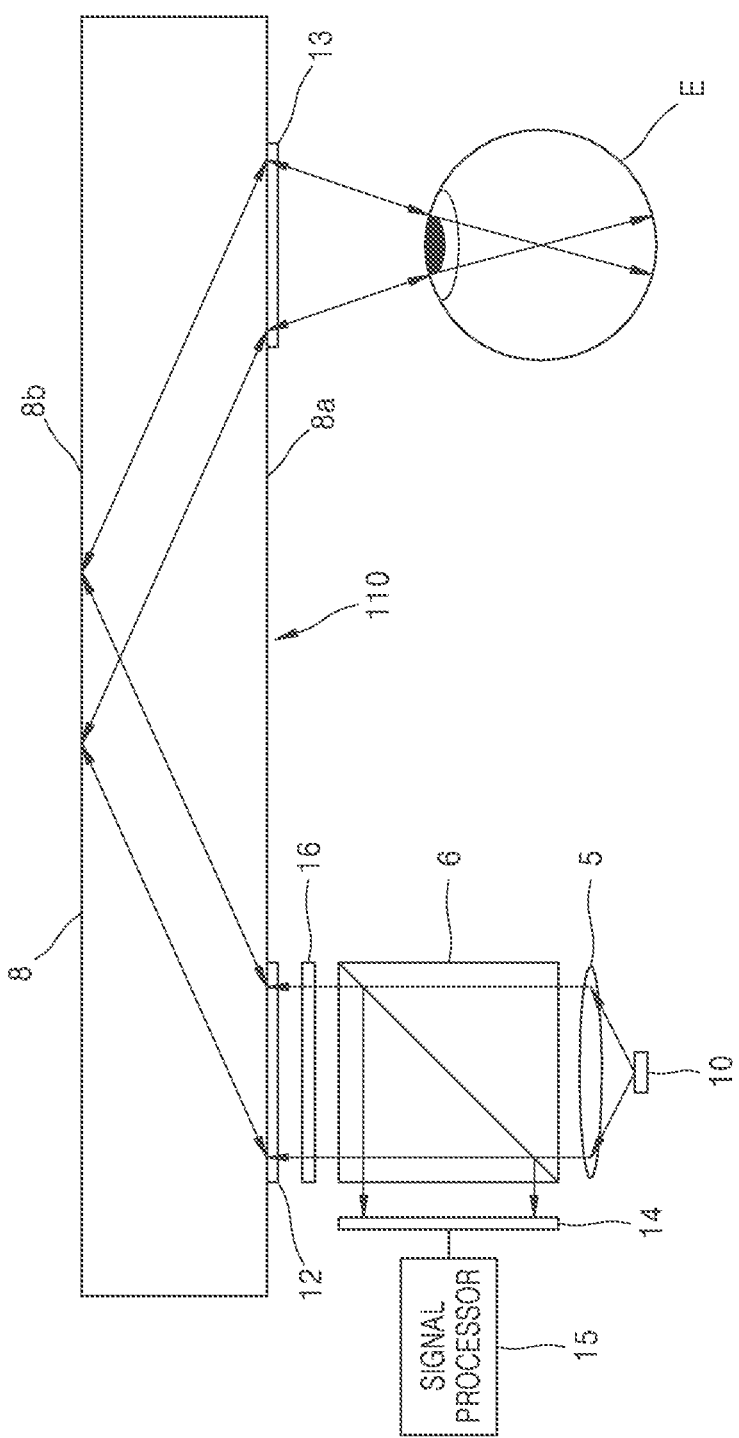
FIG. 6 is a cross-sectional view illustrating a structure of an eye-tracking device according to another example embodiment.

FIG. 6 is a cross-sectional view illustrating a structure of an eye-tracking device 110 according to another example embodiment. Compared to the eye-tracking device 100 of FIG. 1, in the eye-tracking device 110 of FIG. 6, the first and second input/output couplers 12 and 13 are disposed on the first surface 8a of the light guide plate 8. For example, the first input/output coupler 12 may be disposed on an edge portion of the first surface 8a of the light guide plate 8, and the second input/output coupler 13 may be disposed on another edge portion of the first surface 8a of the light guide plate 8. In particular, the first input/output coupler 12 is disposed on the first surface 8a of the light guide plate 8 to face the beam splitter 6.

Figure 7:
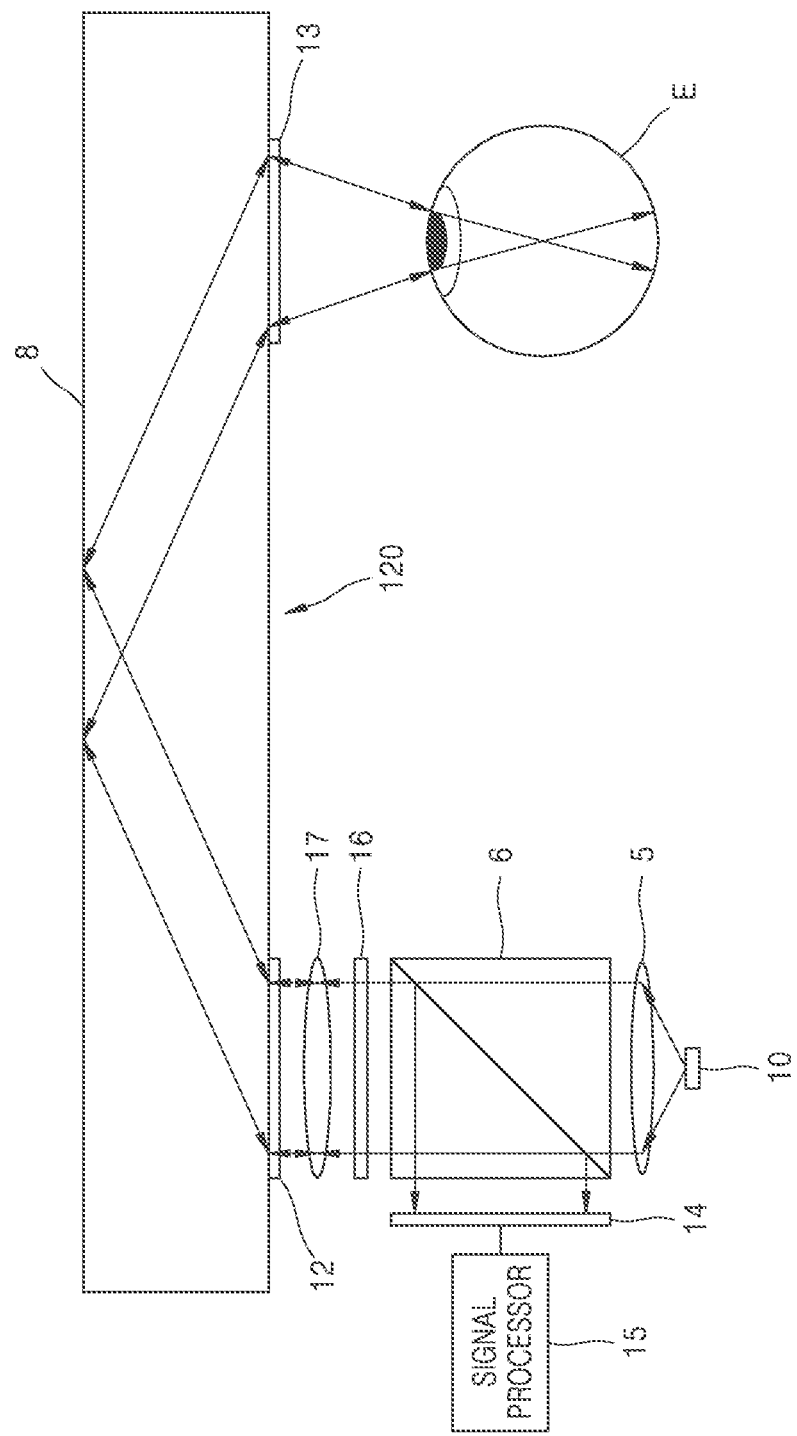
FIG. 7 is a cross-sectional view illustrating a structure of an eye-tracking device according to another example embodiment.

FIG. 7 is a cross-sectional view illustrating a structure of an eye-tracking device 120 according to another example embodiment. Referring to FIG. 7, the eye-tracking device 120 may further include a varifocal lens 17 disposed between the light guide plate 8 and the beam splitter 6. Although the varifocal lens 17 is disposed between the quarter-wave plate 16 and the light guide plate 8 in FIG. 7, the present disclosure is not limited thereto. For example, the varifocal lens 17 may be disposed in any optical path between the light guide plate 8 and the beam splitter 6 without limitation. Alternatively, the varifocal lens 17 may be disposed in any optical path between the light guide plate 8 and the observer's eye E without limitation.

As shown in FIG. 2B, when the second input/output coupler 13 has a positive (+) refractive power and when a distance between the observer's eye E and the second input/output coupler 13 is within a pre-determined range, illumination light output-coupled from the second input/output coupler 13 is accurately focused on the center of rotation of the observer's eye E. When the observer's eye E is too close to the second input/output coupler 13 (e.g., a distance between the observer's eye E and the second input/output coupler 13 is less than a lower distance limit) or too far from the second input/output coupler 13 (e.g., the distance between the observer's eye E and the second input/output coupler 13 is greater than an upper distance limit), the illumination light is not focused on the center of rotation of the observer's eye E. Also, because a focal length of the pupil of the eye E may vary according to the observer, the illumination light may not be focused on the center of rotation of the observer's eye E according to the focal length of the pupil of the observer's eye E. When the illumination light is not accurately focused on the center of rotation of the observer's eye E, illumination light reflected by the retina may not travel along the same optical path as a previous optical path, thereby reducing the accuracy of measurement.

Also, as shown in FIG. 2A, when the second input/output coupler 13 has no optical refractive power, the illumination light may not be accurately focused on the retina of the observer's eye E according to the focal length of the pupil of the observer's eye E. Even in this case, the illumination light reflected by the retina may not travel along the same optical path as the previous optical path, thereby reducing the accuracy of measurement.

The varifocal lens 17 may change a focal length to accurately focus the illumination light output-coupled from the second input/output coupler 13 on the center of rotation of the observer's eye E or on the retina of the observer's eye E. For example, the varifocal lens 17 may be configured to change a focal length according to a distance between the second input/output coupler 13 and the observer's eye E. Accordingly, the accuracy of measurement may be improved by using the varifocal lens 17. For example, the varifocal lens 17 may further include a liquid crystal lens or an electrowetting lens.

Figure 8:
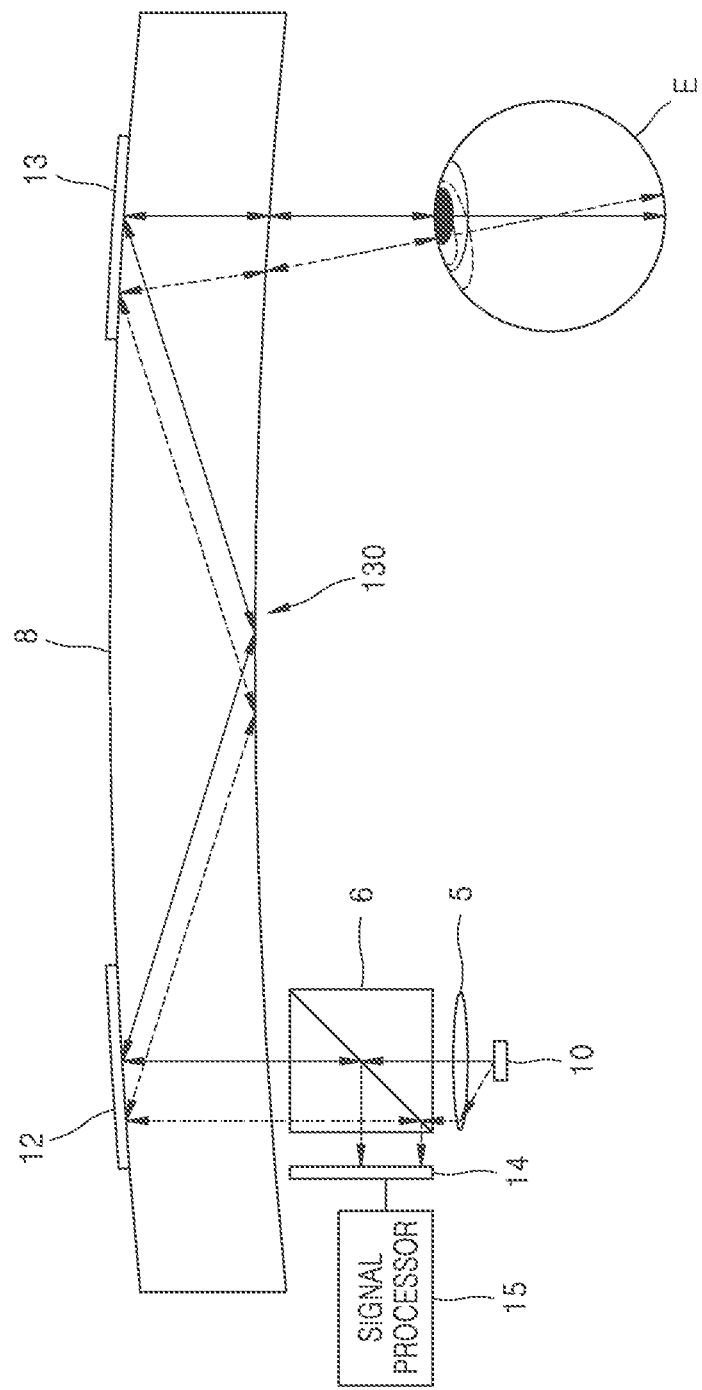
FIG. 8 is a cross-sectional view illustrating a structure of an eye-tracking device according to another example embodiment.

FIG. 8 is a cross-sectional view illustrating a structure of an eye-tracking device 130 according to another example embodiment. Compared to the eye-tracking device 100 of FIG. 1, the eye-tracking device 130 of FIG. 8 includes the light guide plate 8 having a curved shape. For example, when the eye-tracking device 130 is applied to a display apparatus worn on a person's head such as a head-mounted display (HMD), it may be useful to use the light guide plate 8 having a curved shape.

Figure 9:
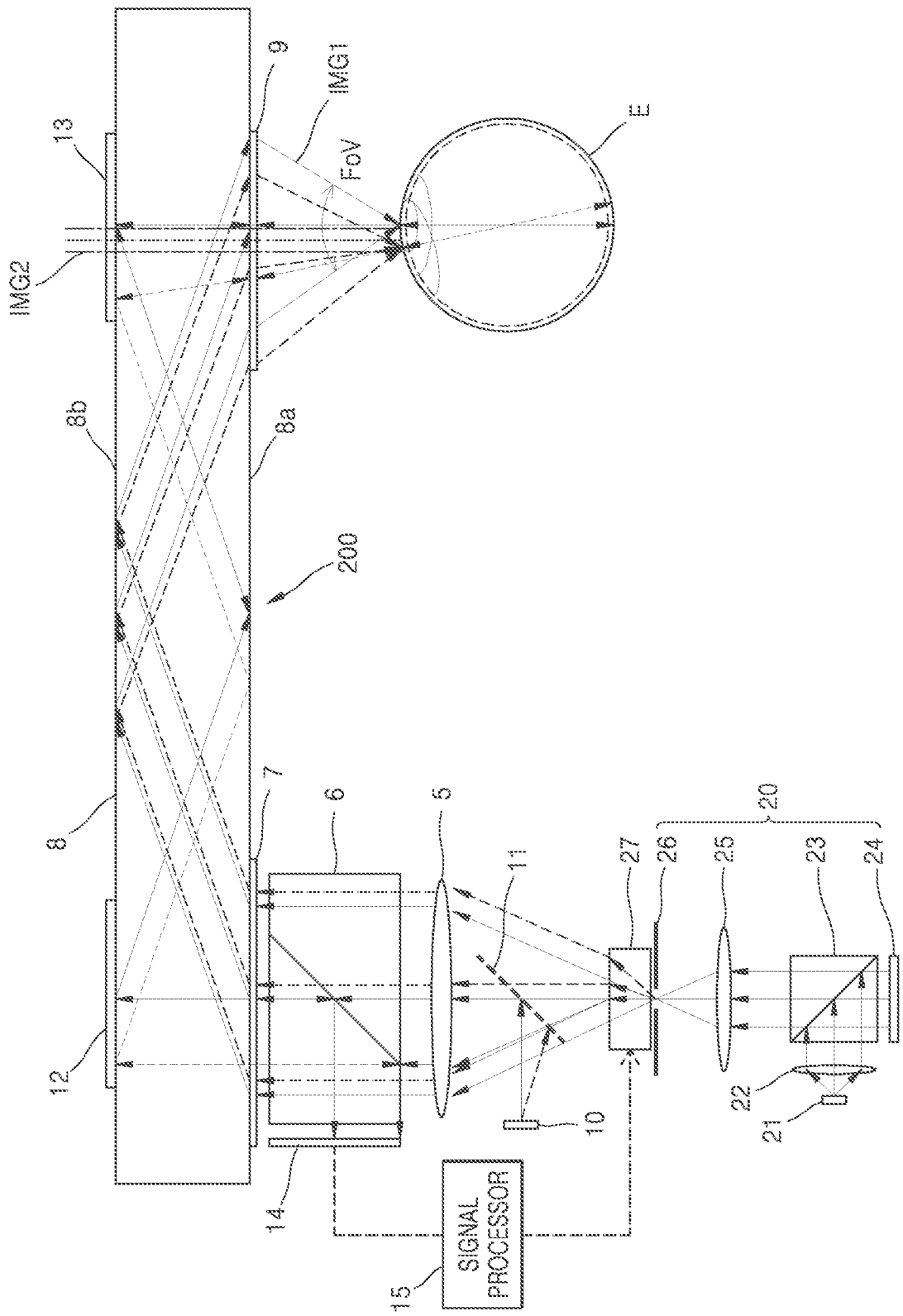
FIG. 9 is a cross-sectional view of a display apparatus including an eye-tracking device according to an example embodiment.

The eye-tracking device 100, 100', 110, 120, or 130 may be applied to a display apparatus for providing an image in accordance with an observer's viewpoint. In particular, the eye-tracking device 100, 100', 110, 120, or 130 may be easily integrated to a display apparatus for providing an image by using a light guide plate. For example, FIG. 9 is a cross-sectional view of a display apparatus including an eye-tracking device according to an example embodiment. Referring to FIG. 9, a display apparatus 200 is integrated to the eye-tracking device 100 of FIG. 1. For example, the display apparatus 200 may include an image forming device 20 for forming an image, an eye-tracking device for tracking an observer's eye, and an image shifter 27 for moving the image according to the observer's eye provided from the eye-tracking device. Although the eye-tracking device of FIG. 9 has substantially the same structure as that of the eye-tracking device 100 of FIG. 1, the display apparatus 200 may include any of the eye-tracking devices 100', 110, 120, and 130 of FIGS. 5 through 8.

The eye-tracking device may include the light source 10 that emits infrared illumination light, the photodetector array 14 that detects infrared light, the light guide plate 8 that transmits illumination light, the beam splitter 6 that separates illumination light emitted from the light source 10 from illumination light reflected from the observer's eye E, and the signal processor 15 that determines the angle of rotation of the observer's eye based on an output of the photodetector array 14. Also, the eye-tracking device may include a wavelength selective mirror 11 that reflects infrared illumination light emitted from the light source 10 to the beam splitter 6. For example, the wavelength selective mirror 11 may be configured to reflect light in an infrared band and transmit light in a visible band. The collimating lens 5 may be further disposed between the wavelength selective mirror 11 and the beam splitter 6.

Also, the image forming device 20 may include a light source 21 that emits visible light, a spatial light modulator 24 that modulates the visible light emitted from the light source 21 and generates an image, and a beam splitter 23 that transmits the visible light emitted from the light source 21 to the spatial light modulator 24 and transmits the image formed by the spatial light modulator 24 to the light guide plate 8. Also, the image forming device 20 may further include a collimating lens 22 that is disposed between the light source 21 and the beam splitter 23, a focusing lens 25 that focuses light transmitted through the beam splitter 23, and an aperture 26 that transmits only light including the image. The aperture 26 may be disposed on a focus position of the focusing lens 25. According to the present example embodiment, the beam splitter 6, the collimating lens 5, and the wavelength selective mirror 11 of the eye-tracking device and the aperture 26, the focusing lens 25, the beam splitter 23, and the spatial light modulator 24 of the image forming device 20 may be aligned with one another.

The beam splitter 23 may be a half mirror that simply transmits half of incident light and transmits the other half. Instead, the beam splitter 23 may be a polarizing beam splitter having polarization selectivity. For example, the beam splitter 23 may be configured to reflect light having a first polarization component and transmit light having a second linear polarization component perpendicular to the first linear polarization component. In this case, light having the first linear polarization component from among visible light emitted from the light source 21 is reflected by the beam splitter 23 and is incident on the spatial light modulator 24, and light having the second linear polarization component is transmitted through the beam splitter 23 and is discarded. Also, the light source 21 may be a polarized laser that emits only light having the first linear polarization component. Accordingly, light emitted from the light source 21 may be all reflected by the beam splitter 23 and may be incident on the spatial light modulator 24.

In the example embodiment of FIG. 9, the spatial light modulator 24 may be a reflective spatial light modulator that reflects and modulates incident light. For example, a liquid crystal on silicon (LCoS), a digital micromirror device (DMD), or a semiconductor modulator may be used as the spatial light modulator 24. Light reflected by the beam splitter 23 is modulated by the spatial light modulator 24 to include image information. Light having the first linear polarization component is reflected by the spatial light modulator 24 to have the second linear polarization component. Accordingly, light modulated by the spatial light modulator 24 is transmitted through the beam splitter 23.

Visible light transmitted through the beam splitter 23 passes through the focusing lens 25 and the aperture 26. The visible light passing through the aperture 26 becomes divergent light having a larger beam diameter. Next, the visible light passes through the wavelength selective mirror 11 and becomes parallel light due to the collimating lens 5. Next, the visible light including the image information is transmitted through the beam splitter 6 of the eye-tracking device and is incident on the light guide plate 8. As described above, the beam splitter 6 may be configured to function as a beam splitter for illumination light emitted from the light source 10 and to be transparent to light in other wavelength bands. For example, the beam splitter 6 may be configured to function as a beam splitter only for infrared light and to transmit visible light. Accordingly, visible light emitted from the light source 21 may pass through the beam splitter 6 and may be incident on the light guide plate 8.

The light guide plate 8 is configured to transmit both infrared light and visible light. To this end, an input coupler 7 that obliquely guides visible light incident from the outside into the light guide plate 8 and an output coupler 9 that outputs visible light obliquely traveling inside the light guide plate 8 to the outside of the light guide plate may be further disposed on the first surface 8a of the light guide plate 8. For example, the input coupler 7 may be disposed on an edge portion of the first surface 8a of the light guide plate 8, and the output coupler 9 may be disposed on another edge portion of the first surface 8a of the light guide plate 8. The input coupler 7 and the output coupler 9 may include a DOE or an HOE, like the first and second input/output couplers 12 and 13. In particular, the output coupler 9 may be configured to have an optical refractive power. The output coupler 9 may output-couple light obliquely incident on the output coupler 9 and may focus the light on one point.

Also, the first and second input/output couplers 12 and 13 that obliquely guide infrared light, which is incident from the outside, into the light guide plate 8 and output infrared light, which obliquely travels inside the light guide plate 8, to the outside of the light guide plate 8 may be disposed on the second surface 8b of the light guide plate 8. For example, the first input/output coupler 12 may be disposed on an edge portion of the second surface 8b of the light guide plate 8, and the second input/output coupler 13 may be disposed on another edge portion of the second surface 8b of the light guide plate 8.

Although the first and second input/output couplers 12 and 13 are disposed on the second surface 8b of the light guide plate 8 and the input coupler 7 and the output coupler 9 are disposed on the first surface 8a of the light guide plate 8, the present disclosure is not limited thereto. For example, the first and second input/output couplers 12 and 13 may be disposed on the first surface 8a of the light guide plate 8, and the input coupler 7 and the output coupler 9 may be disposed on the second surface 8b of the light guide plate 8. In any case, the input coupler 7 and the first input/output coupler 12 face each other, and the output coupler 9 and the second input/output coupler 13 face each other. Also, the input coupler 7 may face the beam splitter 6. Accordingly, the first input/output coupler 12, the input coupler 7, the beam splitter 6, the collimating lens 5, the wavelength selective mirror 11, the aperture 26, the focusing lens 25, the beam splitter 23, and the spatial light modulator 24 may be sequentially aligned with one another, or the input coupler 7, the first input/output coupler 12, the beam splitter 6, the collimating lens 5, the wavelength selective mirror 11, the aperture 26, the focusing lens 25, the beam splitter 23, and the spatial light modulator 24 may be sequentially aligned with one another.

The input coupler 7 and the output coupler 9 may be configured to serve as couplers only for visible light, and the first and second input/output couplers 12 and 13 may be configured to serve as couplers only for infrared light. Accordingly, infrared light transmitted through the beam splitter 6 is transmitted through the input coupler 7 and is input-coupled by the first input/output coupler 12. Also, infrared light output-coupled by the second input/output coupler 13 is transmitted through the output coupler 9 and is incident on the observer's eye E, and infrared light reflected by the observer's eye E is transmitted through the output coupler 9 and is input-coupled by the second input/output coupler 13. The infrared light output-coupled by the first input/output coupler 12 may be transmitted through the input coupler 7 and may be reflected by the beam splitter 6. Accordingly, visible light including image information may be provided through the input coupler 7 and the output coupler 9 to the observer's eye E. Also, infrared light for eye tracking may be emitted through the first and second input/output couplers 12 and 13 to the observer's eye E, may be reflected by the observer's eye E, and may be incident on the photodetector array 14.

The signal processor 15 of the eye-tracking device may determine the angle of rotation of the observer's eye based on an output of the photodetector array 14 and may control the image shifter 27 based on determined eye information. For example, the signal processor 15 may accurately provide an image to the observer's eye E by controlling the image shifter 27 to move a position of the image in a direction perpendicular to an optical axis according to the observer's eye position. Accordingly, regardless of a change in a position of the observer's eye E, the image may always be provided to the observer's eye E. The image shifter 27 may be disposed adjacent to, for example, a light exit surface of the aperture 26. The image shifter 27 may move a path of the image in the direction perpendicular to the optical axis under the control of the signal processor 15, without changing a propagation angle of the image passing through the aperture 26. Instead, the image shifter 27 may be an actuator that moves the image forming device 20 in the direction perpendicular to the optical axis.

As described above, the display apparatus 200 having a structure of FIG. 9 may be easily integrated to an eye-tracking device. For example, an optical path of infrared light for eye tracking and an optical path of visible light for providing an image may be formed by using one light guide plate 8, and the infrared light for eye tracking and the visible light for providing the image may travel along one optical path without being interfered with each other. Accordingly, the display apparatus 200 employing the eye-tracking device may be made compact. Also, because visible light including image information is focused by the output coupler 9 having a large size and is incident on the observer's eye E, the display apparatus 200 may provide a relatively large field of view (FoV).

The second input/output coupler 13 is configured to serve as a coupler only for infrared light, and the output coupler 9 is configured to serve as a coupler only for visible light that is obliquely incident. Visible light incident from the outside toward the second surface 8b of the light guide plate 8 may pass through the second input/output coupler 13 and the output coupler 9 and may be incident on the observer's eye E. Accordingly, the display apparatus 200 according to the present example embodiment may be applied to realize AR or MR. In particular, the display apparatus 200 according to the present example embodiment that is a holographic display apparatus may be a near-eye AR display apparatus. For example, the observer's eye E may see external light containing an external foreground scene IMG2 perpendicularly transmitted through the output coupler 9 and an image IMG1 reproduced by the spatial light modulator 24. The external light may contain the external foreground scene IMG2 which actually exists in front of the observer, instead of an artificial image modulated and generated by a separate spatial light modulator or displayed by a separate display panel. Accordingly, the observer may simultaneously recognize both the image IMG1 that is an artificially generated virtual image and the external foreground scene IMG2 that actually exists.

Figure 10:
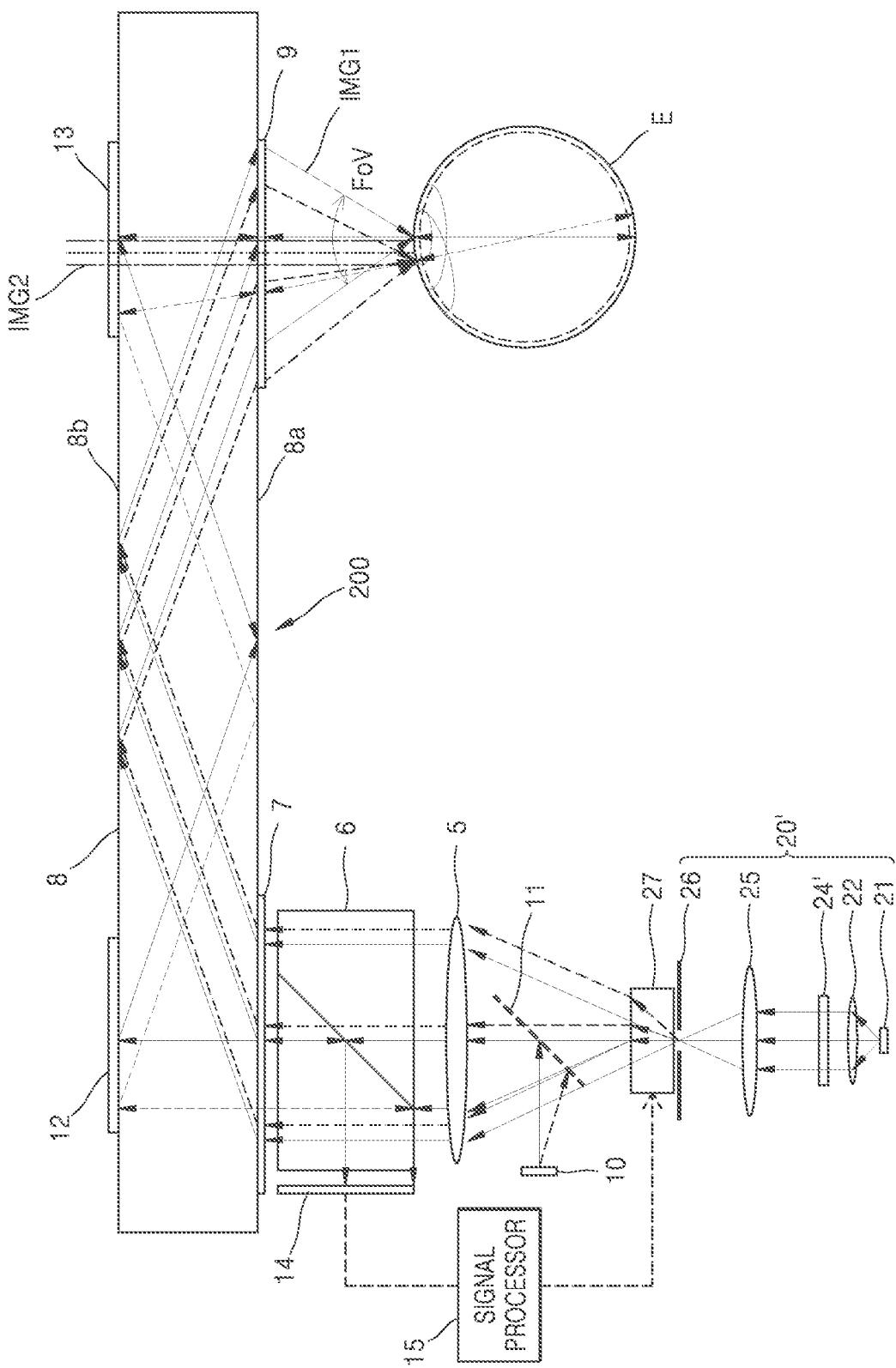
FIG. 10 is a cross-sectional view of a display apparatus including an eye-tracking device according to another example embodiment.

Although the spatial light modulator 24 is a reflective spatial light modulator in FIG. 9, a transmissive spatial light modulator for modulating transmitted light may be used. For example, FIG. 10 is a cross-sectional view illustrating a display apparatus including an eye-tracking device according to another example embodiment. Referring to FIG. 10, an image forming device 20' of a display apparatus 200' may include the light source 21, the collimating lens 22, a spatial light modulator 24', the focusing lens 25, and the aperture 26 that are sequentially disposed in a propagation direction of light. In particular, the first input/output coupler 12, the input coupler 7, the beam splitter 6, the collimating lens 5, the wavelength selective mirror 11, the aperture 26, the focusing lens 25, the spatial light modulator 24', the collimating lens 22, and the light source 21 may be aligned with one another.

The spatial light modulator 24' is a transmissive spatial light modulator that modulates transmitted light. For example, the spatial light modulator 24' may use a liquid crystal device (LCD). When the spatial light modulator 24' that is a transmissive spatial light modulator is used, a configuration of an optical system may be more simplified because the beam splitter 23 may be omitted. Other elements of the display apparatus 200' of FIG. 10 are substantially the same as those of the display apparatus 200 of FIG. 9.

Figure 11:
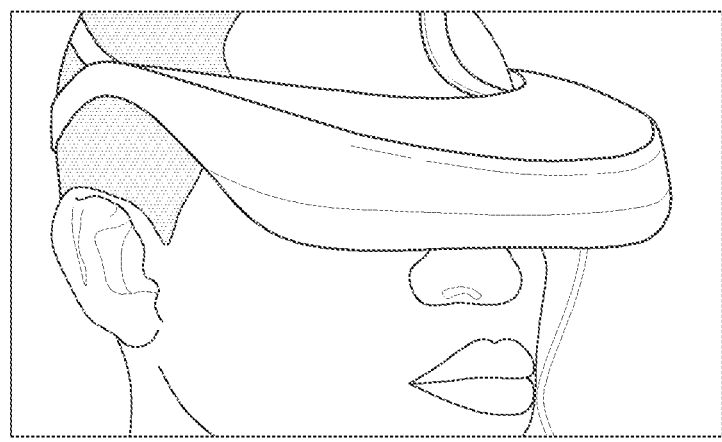
FIGS. 11 through 13 illustrate various electronic devices to which a display apparatus may be applied.
Figure 12:
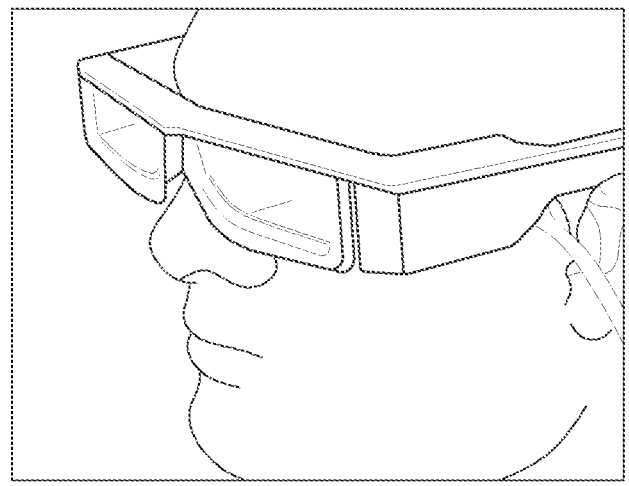
Figure 13:
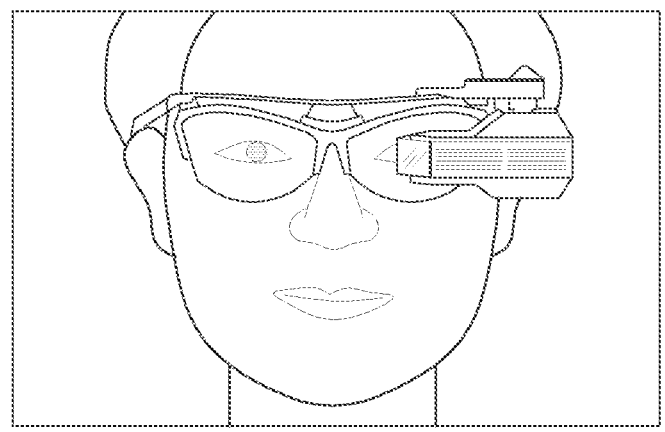

As described above, the display apparatus 200 or 200' may be applied to realize AR or MR. For example, FIGS. 11 through 13 illustrate various electronic devices to which a display apparatus may be applied. As shown in FIGS. 11 through 13, at least some of display apparatuses according to various example embodiments may constitute wearable apparatuses. In other words, a display apparatus may be applied to a wearable apparatus. For example, the display apparatus may be applied to an HMD. Also, the display apparatus may be applied to a glasses-type display, a goggle-type display, etc. Wearable electronic devices of FIGS. 11 through 13 may interoperate with smartphones.

In addition, display apparatuses according to various example embodiments may be provided in smartphones, and the smartphones may be used as multi-image display apparatuses. In other words, the display apparatus may be applied to small electronic devices (mobile electronic devices), instead of wearable apparatus of FIGS. 11 through 13. Fields to which display apparatuses according to various example embodiments are applied may be changed in various ways. For example, display apparatuses according to various example embodiments may be applied to realize AR or MR and may also be applied to other fields. In other words, the various example embodiments may be applied to displays that may simultaneously provide a plurality of images, instead of AR or MR.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art. While an eye-tracking device and a display apparatus including the same have been particularly shown and described with reference to example embodiments thereof, it will be understood by one of ordinary skill in the art that various changes in form and details may be made therein.

What is claimed is:

1. An eye-tracking device comprising:
   a light source configured to emit an illumination light;
   a light guide plate configured to transmit the illumination light emitted from the light source to an observer's eye and transmit the illumination light reflected from the observer's eye in a direction opposite to a propagation direction of the illumination light emitted from the light source;
   a photodetector array configured to detect the illumination light reflected from the observer's eye, the photodetector array comprising a plurality of two-dimensionally arranged photodiodes; and
   a signal processor configured to determine a displacement of the observer's eye based on a two-dimensional (2D) intensity distribution of the illumination light incident on the plurality of photodiodes,
   wherein the light guide plate comprises:
      a first input/output coupler and a second input/output coupler configured to guide the illumination light to be incident into the light guide plate, to travel inside the light guide plate, and to travel outside the light guide plate;
      an input coupler facing the first input/output coupler, the input coupler being configured to guide visible light into the light guide plate; and
      an output coupler facing the second input/output coupler, the output coupler being configured to output the visible light traveling inside the light guide plate to an outside of the light guide plate,
   wherein the eye-tracking device further comprises:
      a wavelength selective mirror facing the input coupler and the first input/output coupler and configured to combine the illumination light emitted from the light source with an image formed by an image forming device and cause a combination of the illumination light and the image to propagate through a same optical path; and
      a beam splitter disposed between the wavelength selective mirror and the light guide plate and configured to transmit the illumination light emitted from the light source to the first input/output coupler and transmit the illumination light received from the first input/output coupler to the photodetector array.

2. The eye-tracking device of claim 1, wherein the light source faces a first surface of the beam splitter, and the photodetector array faces a second surface of the beam splitter, and
   wherein the first surface of the beam splitter is disposed to oppose the second surface of the beam splitter.

3. The eye-tracking device of claim 1, wherein the beam splitter comprises a half mirror configured to reflect a first half of the illumination light and transmit a second half of the illumination light.

4. The eye-tracking device of claim 1, wherein the beam splitter comprises a polarizing beam splitter configured to reflect the illumination light having a first linear polarization component and configured to transmit the illumination light having a second linear polarization component perpendicular to the first linear polarization component.

5. The eye-tracking device of claim 2, further comprising a quarter-wave plate disposed between the beam splitter and the light guide plate.

6. The eye-tracking device of claim 1, further comprising a varifocal lens disposed between the beam splitter and the light guide plate and configured to change a focal length according to a distance between the second input/output coupler and the observer's eye.

7. The eye-tracking device of claim 1, wherein the light guide plate comprises a first surface and a second surface facing the first surface,
wherein the light source and the photodetector array face the first surface of the light guide plate, and the first input/output coupler and the second input/output coupler are disposed on the second surface of the light guide plate.

8. The eye-tracking device of claim 1, wherein the light guide plate comprises a first surface and a second surface facing the first surface,
wherein the light source and the photodetector array face the first surface of the light guide plate, and the first input/output coupler and the second input/output coupler are disposed on the first surface of the light guide plate.

9. The eye-tracking device of claim 1, wherein the second input/output coupler comprises a holographic optical element having a positive refractive power to focus the illumination light, which is output from the light guide plate and passes through the pupil of the observer's eye, on a center of the observer's eye.

10. The eye-tracking device of claim 1, wherein the light source comprises an infrared light source configured to emit an infrared light as the illumination light.

11. The eye-tracking device of claim 1, wherein the photodetector array comprises a plurality of infrared detectors that are arranged in a two-dimensional (2D) manner.

12. The eye-tracking device of claim 1, wherein the light guide plate has a curved shape.

13. A display apparatus comprising:
an image forming device configured to form an image;
an eye-tracking device configured to track an observer's eye and comprising:
an infrared light source configured to emit an infrared illumination light;
a photodetector array comprising a plurality of infrared photodiodes that are arranged in a two-dimensional (2D) manner;
a light guide plate configured to transmit the infrared illumination light emitted from the infrared light source to the observer's eye and transmit the infrared illumination light reflected from the observer's eye to the photodetector array; and
a signal processor configured to determine a displacement of the observer's eye based on a 2D intensity distribution of the infrared illumination light incident on the plurality of infrared photodiodes; and
an image shifter configured to move the image according to an angle of rotation of the observer's eye,
wherein the light guide plate comprises:
a first input/output coupler and a second input/output coupler configured to guide the infrared illumination light to be incident into the light guide plate, to travel inside the light guide plate, and to travel outside the light guide plate;
an input coupler facing the first input/output coupler, the input coupler being configured to guide visible light into the light guide plate; and
an output coupler facing the second input/output coupler, the output coupler being configured to output the visible light traveling inside the light guide plate to an outside of the light guide plate, wherein the display apparatus further comprises:
a wavelength selective mirror facing the input coupler and the first input/output coupler and configured to combine the infrared illumination light emitted from the infrared light source with the image formed by the image forming device and cause a combination of the infrared illumination light and the image to propagate through a same optical path; and
a beam splitter disposed between the wavelength selective mirror and the light guide plate and configured to transmit the infrared illumination light emitted from the infrared light source to the first input/output coupler and transmit the infrared illumination light received from the first input/output coupler to the photodetector array.

14. The display apparatus of claim 13, wherein the image forming device comprises:
a visible light source configured to emit the visible light; and
a spatial light modulator configured to modulate the visible light emitted from the visible light source and generate the image.

15. The display apparatus of claim 13, wherein the light guide plate comprises a first surface and a second surface facing the first surface,
wherein the input coupler and the output coupler are disposed on the first surface of the light guide plate, and
the first input/output coupler is disposed on the second surface of the light guide plate to face the input coupler, and the second input/output coupler is disposed on the second surface of the light guide plate to face the output coupler.

16. The display apparatus of claim 13, wherein the infrared light source faces a first surface of the beam splitter and the photodetector array faces a second surface of the beam splitter.

17. The display apparatus of claim 13, wherein the beam splitter is configured to reflect a first half of the infrared illumination light, transmit a second half of the infrared illumination light, and transmit the visible light.

18. The display apparatus of claim 13, wherein the beam splitter is configured to reflect the infrared illumination light having a first linear polarization component, transmit the infrared illumination light having a second linear polarization component perpendicular to the first linear polarization component, and transmit the visible light,
wherein the display apparatus further comprises a quarter-wave plate disposed between the beam splitter and the light guide plate.

19. The display apparatus of claim 13, further comprising a varifocal lens disposed between the beam splitter and the light guide plate and configured to change a focal length according to a distance between the second input/output coupler and the observer's eye.

20. The display apparatus of claim 13, wherein the second input/output coupler comprises a holographic optical element having a positive refractive power to focus the infrared illumination light, which is output from the light guide plate and passes through a pupil of the observer's eye, on a center of the observer's eye.

21. The display apparatus of claim 13, wherein the display apparatus includes a virtual reality (VR) display apparatus, an augmented reality (AR) display apparatus, a mixed reality (MR) display apparatus that is a head mounted display, a glasses-type display, or a goggle-type display.

* * * * *